(12) United States Patent
Beckley et al.

(10) Patent No.: US 9,306,242 B2
(45) Date of Patent: Apr. 5, 2016

(54) LEAD-ACID BATTERY MOSS GUARD

(71) Applicant: TROJAN BATTERY COMPANY, LLC, Santa Fe Springs, CA (US)

(72) Inventors: Gordon Beckley, Grayson, GA (US);
Benito Ruiz Vallejo, Chino, CA (US);
Eric Alan Rueter, Grayson, GA (US);
Pandian Balakrishnan, Riverside, CA (US)

(73) Assignee: Trojan Battery Company, Santa Fe Springs, CA (US)

( * ) Notice: Subject to any disclaimer, the term of this patent is extended or adjusted under 35 U.S.C. 154(b) by 318 days.

(21) Appl. No.: 13/830,225

(22) Filed: Mar. 14, 2013

(65) Prior Publication Data
US 2014/0272536 A1    Sep. 18, 2014

(51) Int. Cl.
| H01M 2/02 | (2006.01) |
| H01M 2/10 | (2006.01) |
| H01M 2/30 | (2006.01) |
| H01M 4/14 | (2006.01) |
| H01M 10/12 | (2006.01) |
| H01M 10/06 | (2006.01) |
| H01M 10/42 | (2006.01) |

(52) U.S. Cl.
CPC .............. *H01M 10/06* (2013.01); *H01M 10/12* (2013.01); *H01M 10/4235* (2013.01); *H01M 2/02* (2013.01); *H01M 2/10* (2013.01); *H01M 2/30* (2013.01); *H01M 4/14* (2013.01)

(58) Field of Classification Search
CPC ..... H01M 4/62; H01M 4/628; H01M 2/0237; H01M 2/0434; H01M 2/1077
USPC ............ 429/149, 209, 131, 136, 143, 144, 57
See application file for complete search history.

(56) References Cited

U.S. PATENT DOCUMENTS

| 1,990,976 | A | * | 2/1935 | Booss ............................. 429/136 |
| 2,357,274 | A | * | 8/1944 | Tresise et al. ...................... 429/1 |
| 2,607,810 | A | * | 8/1952 | Walker ........................... 429/143 |
| 3,468,721 | A |  | 9/1969 | Dickover et al. |
| 4,121,019 | A | * | 10/1978 | Garrett, Jr. .......... H01M 10/125 429/186 |
| 4,683,647 | A | * | 8/1987 | Brecht .................... H01M 2/06 29/623.2 |
| 6,300,003 | B1 | * | 10/2001 | Misra .................. H01M 2/0439 429/100 |
| 2002/0155346 | A1 | * | 10/2002 | Misra et al. .................... 429/131 |

OTHER PUBLICATIONS

Unknown, Doyle Shamrock Industries, Battery Mossing Guards Element Protectors [online], [retrieved on May 5, 2014]. Retreived from the Internet <URL: http://www.doyleshamrock.com/battery-element-protectors.html> 24 sheets.

\* cited by examiner

*Primary Examiner* — Kenneth Douyette
(74) *Attorney, Agent, or Firm* — Arent Fox LLP

(57) ABSTRACT

A moss guard for a lead-acid battery cell includes a body and a plurality of fingers extending from a side of the body. The plurality of fingers are configured to substantially cover the top surfaces of negative electrodes between the negative electrodes and a positive strap. An end of at least one of the plurality of fingers distal to the body includes a lock, and the lock is configured to resiliently deflect between an engaged position and a disengaged position. The lock is configured to fix the moss guard with respect to positive lugs while in the engaged position.

20 Claims, 4 Drawing Sheets

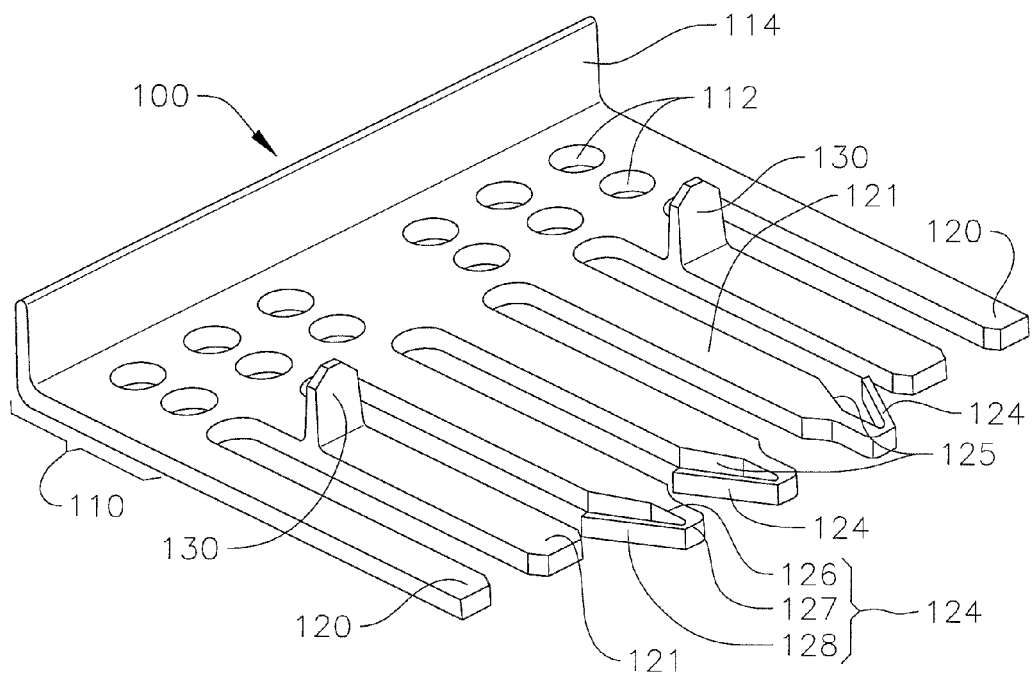
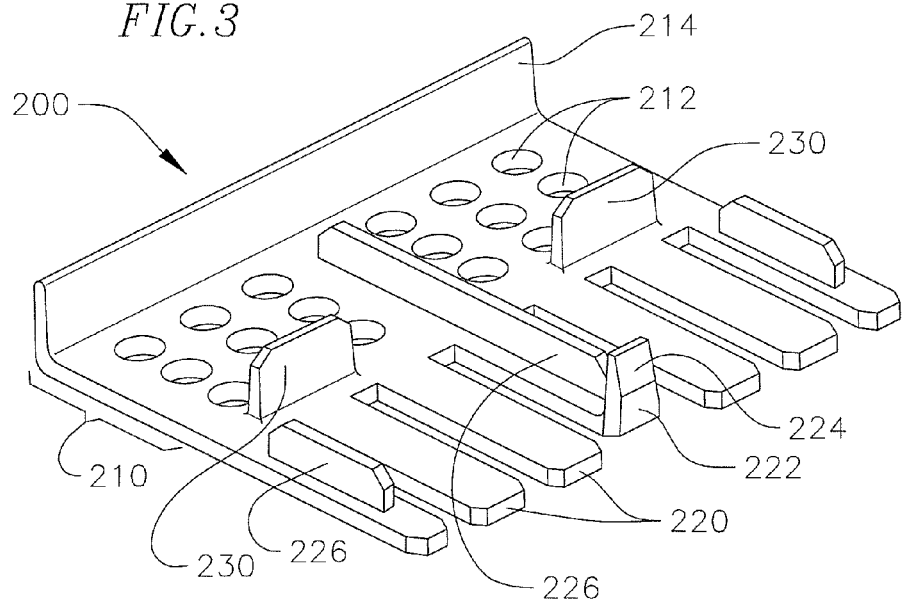

LEAD-ACID BATTERY MOSS GUARD

FIELD

The present invention relates to flooded or wet cell lead-acid electrochemical batteries, and more particularly to moss guards for use in such batteries.

BACKGROUND

A typical flooded lead-acid battery includes positive and negative electrodes and an electrolyte. The electrodes include grids, which are primarily constructed of lead, are often alloyed with antimony, calcium, or tin to improve their mechanical characteristics. Antimony is generally a preferred alloying material for grids in deep discharge batteries.

In a flooded lead-acid battery, positive and negative active material pastes are added to positive and negative electrode grids, respectively, forming positive and negative electrodes. The positive and negative active material pastes generally comprise lead oxide (PbO or lead (II) oxide.) The electrolyte typically includes an aqueous acid solution, most commonly sulfuric acid. Each of the electrodes includes a lug, e.g., a tab extending up therefrom. Lugs of the positive electrodes are connected via a positive strap, and lugs of the negative electrodes are connected via a negative strap. Once the battery is assembled, the battery undergoes a formation step in which a charge is applied to the battery in order to convert the lead oxide of the positive electrodes to lead dioxide ($PbO_2$ or lead (IV) oxide) and the lead oxide of the negative electrodes to lead.

After the formation step, a battery may be repeatedly discharged and charged in operation. During battery discharge, the positive and negative active materials react with the sulfuric acid of the electrolyte to form lead (II) sulfate ($PbSO_4$). By the reaction of the sulfuric acid with the positive and negative active materials, a portion of the sulfuric acid of the electrolyte is consumed. However, the sulfuric acid returns to the electrolyte upon battery charging. The reaction of the positive and negative active materials with the sulfuric acid of the electrolyte during discharge may be represented by the following formulae.

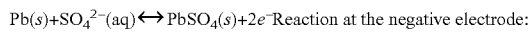

Pb(s)+$SO_4^{2-}$(aq) ↔ $PbSO_4$(s)+$2e^-$ Reaction at the negative electrode:

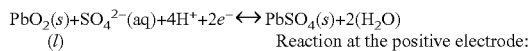

$PbO_2$(s)+$SO_4^{2-}$(aq)+$4H^+$+$2e^-$ ↔ $PbSO_4$(s)+$2(H_2O)$
(I)                                                                             Reaction at the positive electrode:

As shown by these formulae, during discharge, electrical energy is generated, making the flooded lead-acid battery a suitable power source for many applications. For example, flooded lead-acid batteries may be used as power sources for, electric vehicles such as forklifts, golf cars, electric cars, and hybrid cars. Flooded lead-acid batteries are also used for emergency or standby power supplies, or to store power generated by photovoltaic systems.

As a result of repeated charge and discharge, active material can build up on top of the negative electrodes. This buildup is referred to as "moss" with the phenomenon referred to as "mossing." When excessive mossing occurs, it can create a short between the negative electrodes and the positive strap. Accordingly, moss guards are often used in lead-acid batteries to physically prevent the active material building up on top of the negative electrodes from touching the positive strap. Moss guards are made of a semi-flexible material and generally include a body and a plurality of fingers extending from each side of the body. While moss guards are generally only needed between the negative electrodes and the positive strap, in order to secure the moss guards, a plurality of fingers extend from each side of the body portion, thereby securing the moss guard between the positive lugs, on one side, and the negative lugs, on the other side.

However, inserting traditional moss guards into a battery cell can be time consuming and difficult. That is, because the moss guards are made to be secured between the two sets of lugs, they must be bent or folded so that both sides can be inserted. In bending and inserting the moss guards, the separators can be damaged as the fingers are forced in between the plates. As such, traditional moss guards can be time consuming to use and can also damage the battery cells.

SUMMARY

Embodiments of the present invention are directed to a moss guard for a lead-acid battery cell. The lead-acid battery cell includes a plurality of positive electrodes, each comprising an upwardly extending positive lug, a positive strap connecting the positive lugs, a plurality of negative electrodes, the negative electrodes including top surfaces spaced from the positive strap, and one positive electrode is between each adjacent pair of negative electrodes. The moss guard includes a body and a plurality of fingers extending from a side of the body. The plurality of fingers are configured to substantially cover the top surfaces of the negative electrodes between the negative electrodes and the positive strap. An end of at least one of the plurality of fingers distal to the body includes a lock, and the lock is configured to resiliently deflect between an engaged position and a disengaged position. The lock is configured to fix the moss guard with respect to the positive lugs when in the engaged position.

The lock may include a flexible hook. The hook is in the disengaged position when the hook is between adjacent lugs and is in the engaged position when the hook extends beyond adjacent lugs to fix the moss guard with respect to the positive lugs.

An end at each of at least two of the plurality of fingers distal to the body may include a lock.

The plurality of fingers may include two outermost fingers and at least one intermediate finger between the two outermost fingers, and the at least one intermediate finger may include the lock. The at least one intermediate finger may be between two adjacent positive lugs.

The plurality of fingers may be substantially parallel.

The plurality of fingers may be substantially equally spaced apart from one another.

The moss guard may also include a stop configured to abut the positive strap or at least one positive lug and further fix the moss guard with respect to the positive lugs. The stop may include at least one tab extending up from the body or at least one of the plurality of fingers, the stop being configured to contact the strap. The body may include the stop.

The body may include a plurality of openings.

According to some embodiments, a flooded lead-acid battery includes the moss guard.

BRIEF DESCRIPTION OF THE DRAWINGS

The above and other features and advantages of the present invention will be better understood by reference to the following detailed description when considered in conjunction with the attached drawings, in which:

FIG. 2 is a moss guard according to an embodiment of the present invention;

FIG. 3 is a moss guard according to an embodiment of the present invention;

DETAILED DESCRIPTION

According to embodiments of the present invention, a lead-acid battery cell includes an electrolyte and an electrode assembly including a plurality of positive electrodes, each comprising an upwardly extending positive lug, a positive strap connecting the positive lugs, a plurality of negative electrodes including top surfaces spaced from the positive strap, one positive electrode being between each adjacent pair of negative electrodes, and a separator between each adjacent positive electrode and negative electrode. The lead-acid battery cell also includes a moss guard which includes a body and a plurality of fingers extending from a side of the body. The plurality of fingers are configured to substantially cover the top surfaces of the negative electrodes between the negative electrodes and the positive strap. An end of at least one of the plurality of fingers distal to the body includes a lock, and the lock is configured to resiliently deflect between an engaged position and a disengaged position to fix the moss guard with respect to the positive lugs in the engaged position.

Figure 1A:
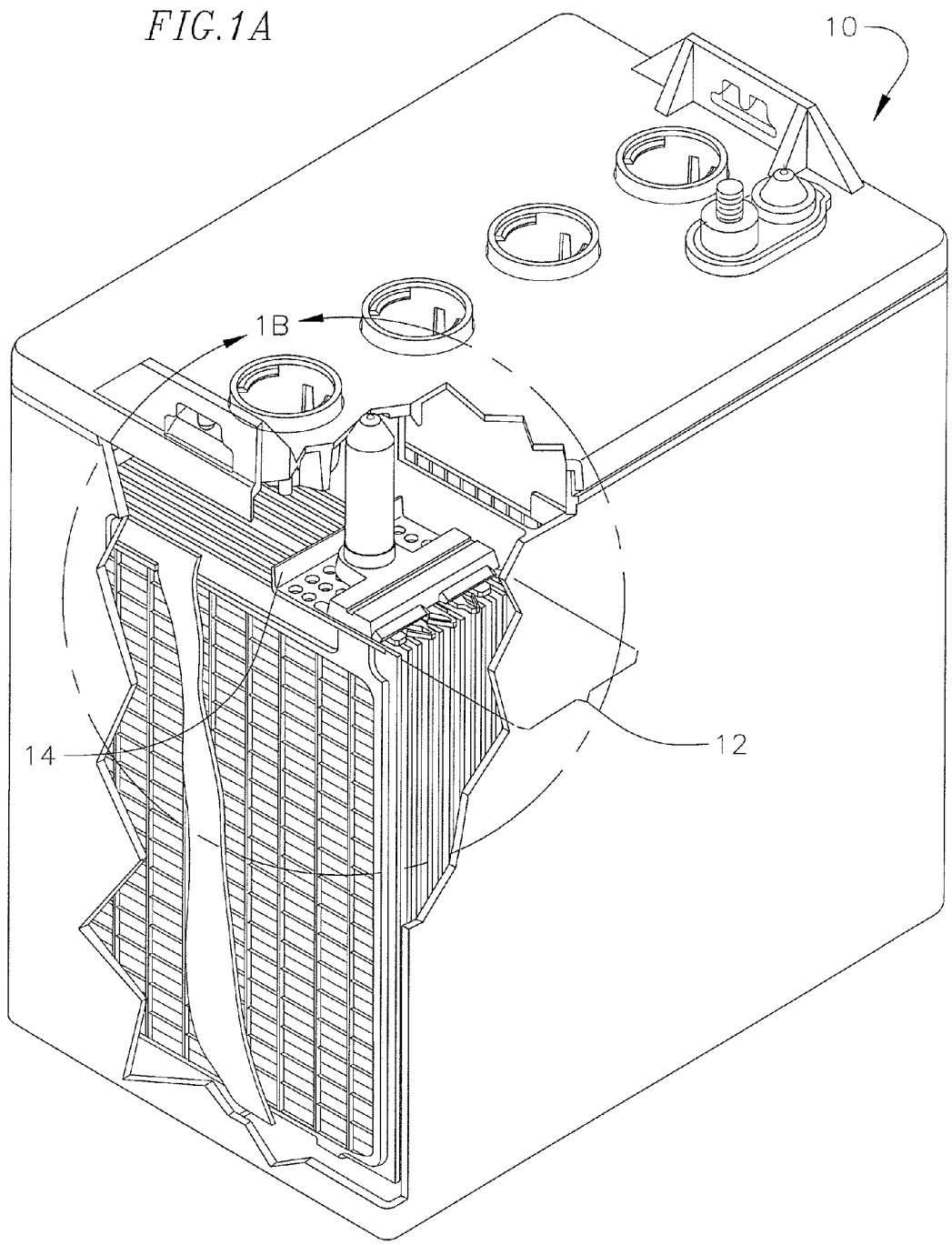
FIG. 1A is a schematic perspective view of a flooded-lead acid battery according to an embodiment of the present invention.
Figure 1B:
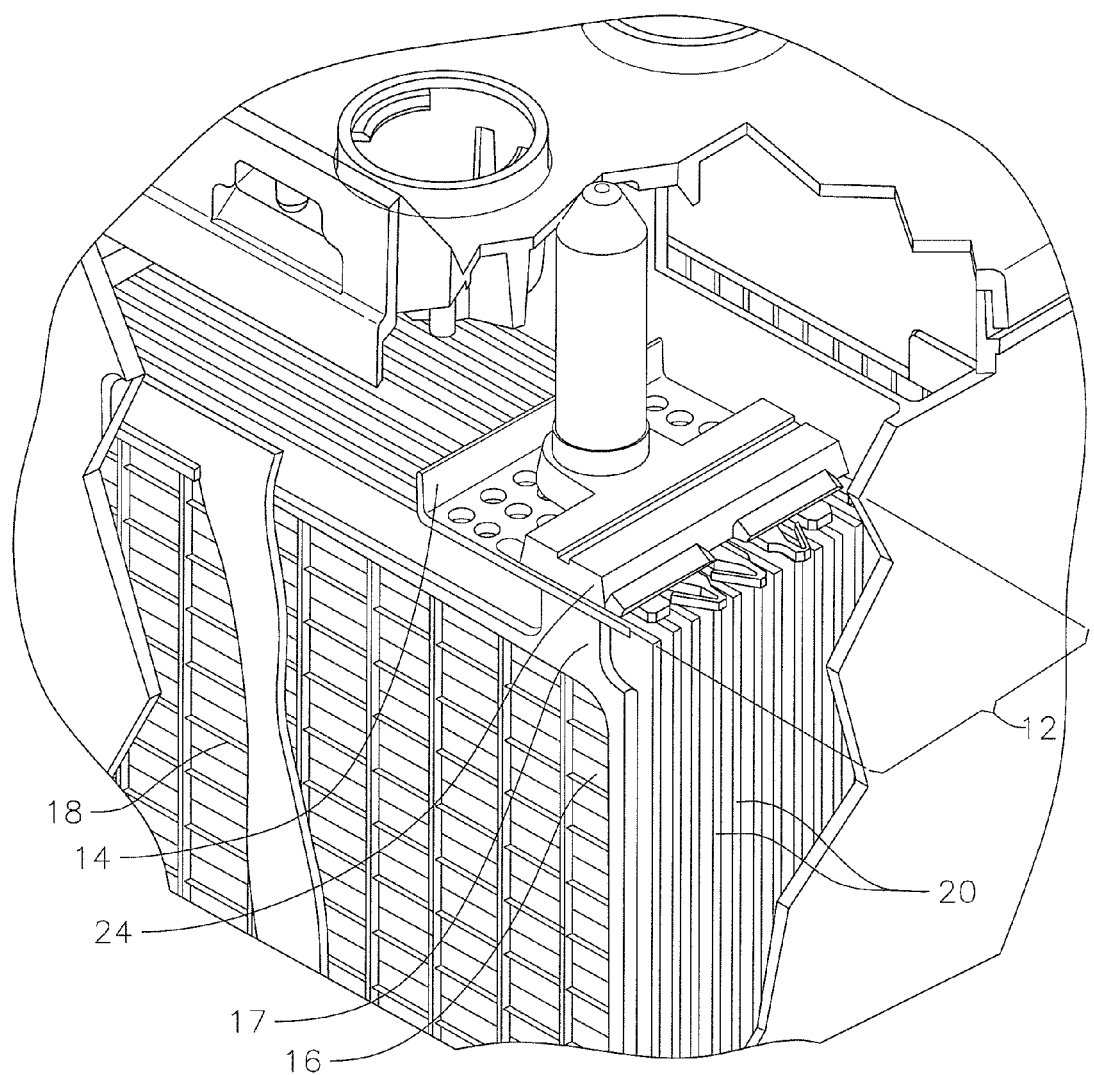
FIG. 1B is an exploded schematic perspective view of a portion of the flooded lead-acid battery of FIG. 1A.

In one embodiment, as shown somewhat schematically in FIGS. 1A and 1B, a multi cell flooded deep discharge lead-acid battery 10 includes a cell 12 that includes a moss guard 14. The battery includes a plurality of negative electrodes 18 and a plurality of positive electrodes 16, each positive electrode 16 being between adjacent negative electrodes 18. As shown in FIGS. 1A and 1B, a cell may include 7 negative electrodes and 6 positive electrodes, however, any suitable number of electrodes may be used in each cell. Each positive electrode includes a grid coated with a positive active material paste. Each negative electrode includes a grid coated with a negative active material paste. The positive and negative electrodes are arranged in an alternating stack within a battery case 22 using a plurality of separators 20 to separate each electrode from adjacent electrodes and prevent short circuits. A plurality of positive lugs 17 extending up from the positive grids are connected by a positive strap 24, thereby connecting the positive electrodes. A plurality of negative lugs extending up from the negative grids are connected by a negative strap, thereby connecting the negative electrodes. A moss guard 14 includes a body, a plurality of fingers, and one or more locks at a distal end of three of the fingers that are engaged on positive lugs 17. An electrolyte solution fills the battery case, and positive and negative battery terminal posts extend from the battery case to provide external electrical contact points used for charging and discharging the battery. The battery case may include a vent to allow excess gas produced during the charge cycle to be vented to atmosphere. A vent cap reduces electrolyte spillage from the battery case. While a four celled battery is illustrated, it should be clear to one of ordinary skill in the art that the invention can be applied to single cell batteries and multiple cell batteries with different numbers of cells.

Any suitable lead-acid battery active materials may be used. For example, each active material may include lead oxide and a binder such as polyester fiber, and may optionally include an additive, as known in the art. Any suitable separator may be used. For example, a single layer rubber separator may be used. Alternatively, a multi-layered separator, including a polymer layer and a rubber layer may be used. The polymer layer may be a pocket that envelops three sides of one set of electrodes, e.g., the negative electrodes. The electrolyte may be any electrolyte that is generally used in flooded lead-acid batteries, e.g., aqueous sulfuric acid.

The batteries may be manufactured by any suitable method. For example, in some embodiments, the batteries may be hand assembled, while in other embodiments, the batteries may be assembled by an automated process. When the manufacture of the battery is automated, a COS (cast on strap) machine is often used to form the strap that connects lugs of a group of electrodes.

As shown in FIG. 2, a moss guard 100 includes a body 110 and a plurality of fingers 120, 121 extending from a side of the body 110. The body 110 connects the fingers 120, 121 and keeps them in alignment. The body can have any suitable size. The body 110 optionally includes a plurality of openings 112. The openings 112 may allow electrolyte to pass through the moss guard 100 to prevent (or reduce) the moss guard from floating (e.g., moving vertically in the battery cell). In addition, the openings 112 may allow for proper gassing and electrolyte mixture. While the embodiment shown in FIG. 2 includes a plurality of patterned circular openings, any type of opening(s) may be used. However, it is preferable that the openings do not affect the rigidity of the body. A handle 114 optionally extends up from the body 110. The handle 114 allows workers to easily handle and install the moss guard 100. While the handle 114 is shown as extending up substantially perpendicularly from the body 110, the handle could be angled from the body (e.g., at 45° or include multiple bends (e.g., two 45° bends). In addition, while the handle 114 is shown as extending the entire width of the body 110, it may only extend along a portion of the width of the body. However, the shape and design of the handle is not particularly limited, and any shape or design could be used that allows for ease of handling and installation.

The plurality of fingers 120, 121 are configured to substantially cover the top surfaces of the negative electrodes between the negative electrodes and the positive strap. As such, the moss guard 100 should include one finger for each of the negative electrodes. The fingers may be substantially parallel to one another and may be substantially evenly spaced. The fingers may include beveled edges at the distal end so that the moss guard may be more easily inserted In addition, the fingers should be wide enough so that they cover the top width of the negative electrodes, but not too wide to prevent insertion in the event there is variation in the spacing between the lugs. For example, when the formation of a lead-acid battery is automated, and a COS machine is used to form the strap, the spacing of the positive lugs may vary, i.e., there is pitch variation from plate to plate. Furthermore, to improve the connection of the positive lugs on each end to the strap, they may be bent inward. Accordingly, the width of the fingers may be about two to three times as wide as the width of the negative electrodes. The fingers should be sufficient long so that they are between the positive strap and the negative electrodes. However, the fingers do not necessarily need to extend over the negative electrode that is beyond the positive strap. As such, the fingers may be formed such that they extend about ¼ inch beyond the positive strap when the stop (which will be described below) is engaged.

An end of at least one of the plurality of fingers distal to the body includes a lock, and the lock is configured to resiliently deflect between an engaged position and a disengaged position to fix the moss guard with respect to the positive lugs in the engaged position. For example, the lock may be a hook 124 that is thinner than the finger, and thus, may deflect under pressure. In one embodiment, the hook 124 is defined by a shank 126 turning at an elbow 127 and terminating at a barb 128. The hook 124 may extend beyond the width of the finger 121 from which it extends. As the moss guard 100 is being inserted so that the fingers extend toward the outside of the cell, the hook 124 deflects inward, in or toward recess 125, to a disengaged position, so that it can be inserted between adjacent lugs. More specifically, as pressure is applied to the hook as the moss guard is being inserted between the lugs, the thinner barb portion 128 elastically deflects inward toward the shank 126. Once the hook extends beyond an adjacent lug, the hook deflects outward from the recess 125 to its natural position, an engaged position, and the hook extends beyond the adjacent lug. More specifically, once the barb 128 extends beyond an adjacent lug, it elastically returns to its natural position away from the shank 126 and generally extends beyond the width of the finger. As such, if the moss guard 100 is pulled outward (i.e., opposite the direction of insertion), the hook 124 (more specifically, the barb 128) engages the adjacent lug and prevents the moss guard from being removed, thereby locking it in place. However, if necessary, after being locked in place, the hook 124 may be manually deflected to the disengaged position so that the moss guard can be removed.

While the lock is depicted as including a single hook, any suitable number of hooks may be used. For example, two hooks on a single finger, one for each adjacent lug, may be used. In such an embodiment, the finger could include a shank and then one barb extending from a shoulder on each side of the shank. In addition, while the lock of FIG. 2 is depicted as resiliently deflecting in a plane parallel to the body 110, the lock could extend up from the finger (e.g., extend up perpendicularly) as shown in FIG. 3. For example, a vertical lock 222 could include a deflectable portion 224 that deflects as it is being passed under the positive strap, in a disengaged position. When the vertical lock 222 extends beyond the positive strap, the lock resiliently extends back to its natural position, an engaged position. As such, if the moss guard 100 is pulled outward (i.e., opposite the direction of insertion), the vertical lock 222 engages the positive strap and prevents the moss guard from being removed.

As shown in FIG. 2, the moss guard 100 may include seven fingers (one for each negative electrode), two outermost fingers 120 and five intermediate fingers 121. A lock may be included on three of the five intermediate fingers 121. As stated above, the outermost lugs may be bent inward, preventing a lock adjacent to the bent lung from engaging it. As such, one or more locks may be included at the intermediate or interior fingers so that the locks more reliably engage adjacent lugs. However, locks may be included at any of the fingers, including the outer fingers 120. While only one lock may be necessary, a plurality of locks may be used for redundancy. That is, as described above, there may be some pitch variation between plates, and thus, the lugs may be unevenly spaced apart. If only one lock is included, the lock, even in the engaged position, may not engage an adjacent lug. As such, when a plurality of locks are included, the likelihood that at least one lock will engage an adjacent lug is high. In addition, one finger may include a hook 124 that extends in a first lateral direction and another finger may include a hook 124 that extends in a second lateral direction opposite the first lateral direction. As stated above, the width of the fingers 120 is less than that of the space between adjacent lugs, and therefore, the fingers may be able to move laterally between the lugs. That is, the entire moss guard, including the fingers, may be able to move laterally. By including hooks that extend in opposite lateral directions, if the fingers move laterally to the left, a hook that extends left may engage an adjacent lug even if a hook that extends to the right does not engage an adjacent lug as a result of the lateral movement. In addition, the width of the outermost fingers 120 may be less than that of the intermediate fingers 121. That is, because the outermost negative electrode is adjacent to the edge of the cell, the width of the outermost fingers 120 should be wide enough to cover the negative electrodes, but not too wide to prevent insertion due to the edge of the cell.

Figure 4:
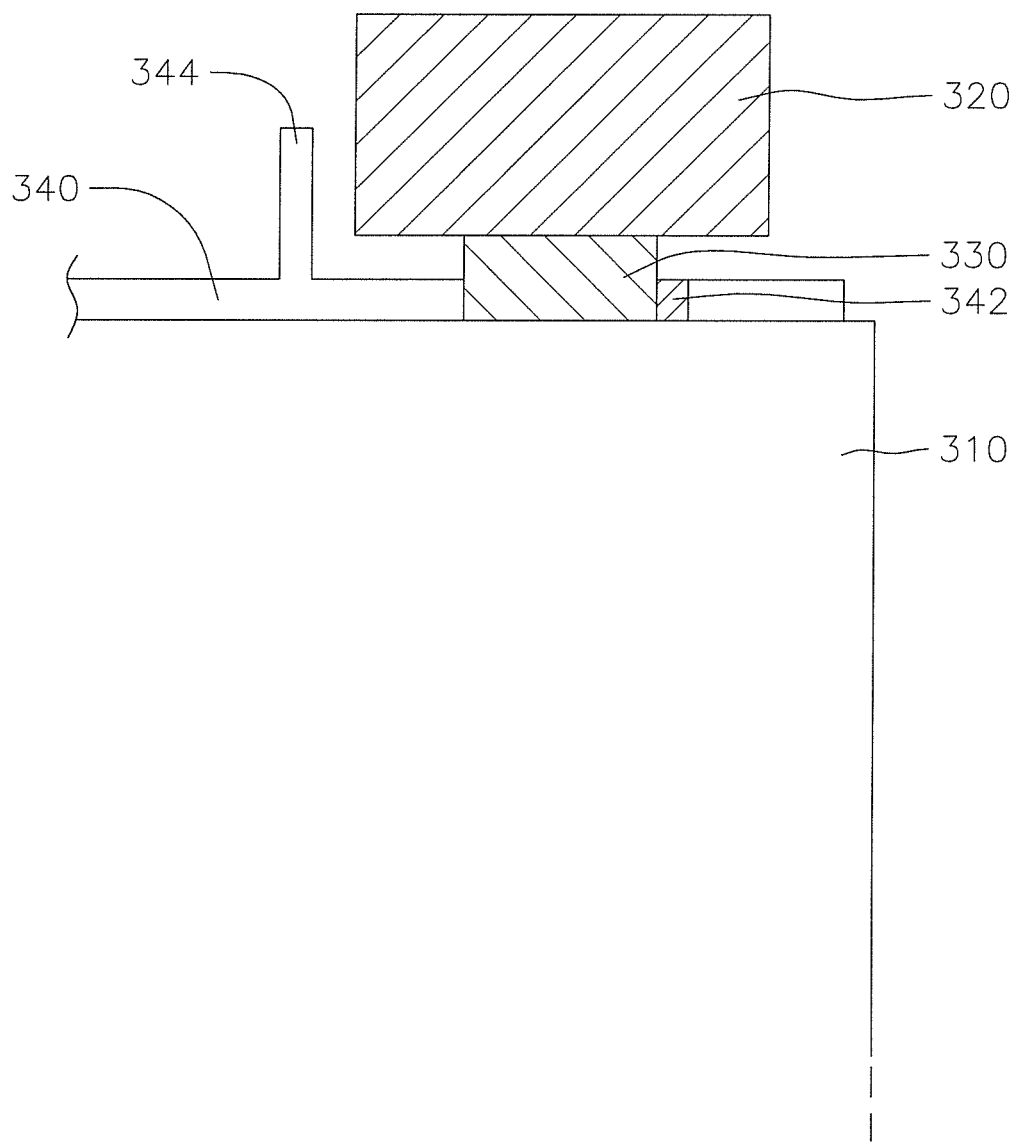
FIG. 4 is a schematic cross-sectional view of a moss guard engaged with an adjacent positive lug according to an embodiment of the present invention.

One or more stops 130 may be included on the fingers 120, 121. The stops are configured to further secure the moss guard 100 to the positive lugs. As shown in FIG. 2, the stops 130 may be vertical tabs. The stops 130 are positioned to abut the positive strap. Some horizontal movement of the fingers is acceptable in most applications. However, the stops may be used to prevent excessive back and forth movement of the fingers. For example, the schematic cross-sectional view of FIG. 4 depicts a negative electrode 310, a positive lug 330 extending up from a positive electrode, a positive strap 320 connected to the positive lug 330, and a finger 340 of a moss guard. The finger 340 includes a hook style lock 342 at an end of the finger 340 and a stop 344 extending up from the finger 340. The hook 342 engages the positive lug 330 when the moss guard moves to the left, and the stop 344 engages the positive strap 320 when the moss guard moves to the right. While the stop 130 is depicted as being on a finger in FIG. 2, as shown in FIG. 3, the stop 130 can be included on the body portion. In addition, the arcuate portions between adjacent fingers can serve as the stop, by contacting adjacent lugs. However, as stated above, the stop 130 is optional, and need not be included.

In addition, as shown in FIG. 3, the moss guard 200 may include spacers 226 extending up vertically from the fingers 220 and/or the body 210. The spacers 226 may extend up from the moss guard 200 to prevent the moss guard from moving vertically with respect to the top of the plates. While vertical movement of the moss guard may not harm the operation of the moss guard, the spacers 226 may prevent excess up and down movement of the moss guard. The spacers may be a continuous piece extending from the body to the finger, as on the middle finger of the moss guard of FIG. 3, or, the moss guard may only cover the fingers, as on the outside fingers of the moss guard of FIG. 3. Alternatively, a plurality of vertical tabs may be used. The spacers 226 are generally less than the height of the stops 230, as they are configured to contact the bottom surface of the strap rather than a side of the strap.

The moss guard 100 may be made of any suitable material that is rigid and resistant to the acidic environment of the lead-acid battery. As stated above, the lock may be formed to be thinner than the remainder of the moss guard so that it is capable of resiliently deflecting. However, the remainder of the moss guard should be sufficiently thick so that it is rigid. In some embodiments, the moss guard 100 may be formed of rubber or a polymer. For example, polypropylene, polyethylene, or other suitable polymers may be used. The moss guard may be formed by molding, extrusion, printing, cutting, or any other suitable method. The moss guard may be any suitable thickness, for example 0.03 inches to 0.11 inches, and in some embodiments, the moss guard may have a thickness of 0.070 inches.

When a moss guard according to embodiments of the present invention is used, it is compact, easy to handle, and may be easily inserted without damaging the separators. Furthermore, because a moss guard is present, separator leaf float, a phenomenon where separator sheets float up during use of the battery, may be substantially prevented. In addition, as lead-acid batteries generally include an odd number of plates, the moss guard cannot be inadvertently installed under the negative strap. Alternatively, an additional moss guard can be formed for use under the negative strap, however, as there are an odd number of plates, it cannot be inadvertently installed under the positive strap. In addition, as mossing only occurs on the negative plates and only causes a short circuit between the negative plates and the positive strap, no negative strap moss guard is necessary.

While the present invention has been illustrated and described with reference to certain exemplary embodiments, those of ordinary skill in the art would appreciate that various modifications and changes can be made to the described embodiments without departing from the spirit and scope of the present invention, as defined in the following claims.

What is claimed is:

1. A moss guard for a lead-acid battery cell, the lead-acid battery cell having a plurality of positive electrodes, each comprising an upwardly extending positive lug, a positive strap connecting the positive lugs, a plurality of negative electrodes, the negative electrodes including top surfaces spaced from the positive strap, one positive electrode being between each adjacent pair of negative electrodes, the moss guard comprising:
a body; and
a plurality of fingers extending from a side of the body, the plurality of fingers configured to substantially cover the top surfaces of the negative electrodes between the negative electrodes and the positive strap, wherein an end of at least one of the plurality of fingers distal to the body comprises a lock, the lock being configured to resiliently deflect between an engaged position and a disengaged position and being configured to fix the moss guard with respect to the positive lugs in the engaged position,
wherein the lock is configured to engage one of the positive lugs or the positive strap in the engaged position.

2. The moss guard of claim 1, wherein the lock comprises a flexible hook.

3. The moss guard of claim 2, wherein the hook is in the disengaged position when the hook is between adjacent lugs and in the engaged position when the hook extends beyond adjacent lugs to fix the moss guard with respect to the positive lugs.

4. The moss guard of claim 1, wherein an end at each of at least two of the plurality of fingers distal to the body comprises a lock.

5. The moss guard of claim 1, wherein the plurality of fingers comprises two outermost fingers and at least one intermediate finger between the two outermost fingers, and the at least one intermediate finger comprises the lock.

6. The moss guard of claim 5, wherein the at least one intermediate finger is between two adjacent positive lugs.

7. The moss guard of claim 1, wherein the plurality of fingers are substantially parallel.

8. The moss guard of claim 1, wherein the plurality of fingers are substantially equally spaced apart from one another.

9. The moss guard of claim 1, wherein the moss guard further comprises a stop configured to abut the positive strap or at least one positive lug and further fix the moss guard with respect to the positive lugs.

10. The moss guard of claim 9, wherein the stop comprises at least one tab extending up from the body or at least one of the plurality of fingers, the stop being configured to contact the strap.

11. The moss guard of claim 10, wherein the body comprises the stop.

12. The moss guard of claim 1, wherein the body comprises a plurality of openings.

13. A lead-acid battery cell comprising:
an electrode assembly comprising:
a plurality of positive electrodes, each comprising an upwardly extending positive lug;
a positive strap connecting the positive lugs;
a plurality of negative electrodes including top surfaces spaced from the positive strap, one positive electrode being between each adjacent pair of negative electrodes; and
a separator between each adjacent positive electrode and negative electrode;
an electrolyte; and
a moss guard comprising:
a body; and
a plurality of fingers extending from a side of the body, the plurality of fingers configured to substantially cover the top surfaces of the negative electrodes between the negative electrodes and the positive strap, wherein an end of at least one of the plurality of fingers distal to the body comprises a lock, the lock being configured to resiliently deflect between an engaged position and a disengaged position and being configured to fix the moss guard with respect to the positive lugs in the engaged position,
wherein the lock is configured to engage one of the positive lugs or the positive strap in the engaged position.

14. The lead-acid battery of claim 13, wherein the lock comprises a hook.

15. The lead-acid battery of claim 14, wherein the lock is in the disengaged position when the hook is between adjacent lugs and in the engaged position when the hook extends beyond adjacent lugs to fix the moss guard with respect to the positive lugs.

16. The lead-acid battery of claim 13, wherein an end at each of at least two of the plurality of fingers distal to the body comprises a lock.

17. The lead-acid battery of claim 13, wherein the plurality of fingers comprises two outermost fingers and at least one intermediate finger between the two outermost fingers, and the at least one intermediate finger comprises the lock.

18. The lead-acid battery of claim 13, wherein the moss guard further comprises a stop configured to abut the positive strap or at least one positive lug and further fix the moss guard with respect to the positive lugs.

19. The lead-acid battery of claim 18, wherein the stop comprises at least one tab extending up from the body or at least one of the plurality of fingers, the stop being configured to contact the strap.

20. The lead-acid battery of claim 13, wherein the body comprises a plurality of openings.

* * * * *